(12) United States Patent
Hasebe et al.

(10) Patent No.: US 8,249,742 B2
(45) Date of Patent: Aug. 21, 2012

(54) MACHINING CONTROL METHOD AND MACHINING INFORMATION GENERATING METHOD FOR MACHINE TOOL

(75) Inventors: Takao Hasebe, Niwa-Gun (JP); Katsuya Hioki, Niwa-Gun (JP); Shunske Wakaoka, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 525 days.

(21) Appl. No.: 11/854,659

(22) Filed: Sep. 13, 2007

(65) Prior Publication Data
US 2008/0082202 A1    Apr. 3, 2008

(30) Foreign Application Priority Data

Sep. 29, 2006    (JP) .................................. 2006-268683

(51) Int. Cl.
*G06F 19/00* (2011.01)
(52) U.S. Cl. ......................... 700/186; 700/159; 700/187
(58) Field of Classification Search .................. 700/159, 700/173, 186, 187, 189, 190; 318/560, 568.15, 318/569–571, 573
See application file for complete search history.

(56) References Cited

U.S. PATENT DOCUMENTS

| | | | | |
|---|---|---|---|---|
| 5,175,680 | A * | 12/1992 | Yoneda et al. .................. | 700/71 |
| 5,664,308 | A * | 9/1997 | Deitert ............................. | 29/40 |
| 5,914,876 | A * | 6/1999 | Hirai ................................ | 700/87 |
| 6,112,133 | A * | 8/2000 | Fishman ......................... | 700/182 |
| 6,868,304 | B2 * | 3/2005 | Uehara et al. .................. | 700/159 |
| 6,922,606 | B1 * | 7/2005 | Yutkowitz ...................... | 700/187 |
| 7,043,332 | B1 * | 5/2006 | Fujinawa et al. .............. | 700/186 |
| 7,123,984 | B2 * | 10/2006 | Tanaka ........................... | 700/193 |
| 2004/0185750 | A1 * | 9/2004 | Kurogouchi .................... | 451/5 |
| 2005/0217095 | A1 * | 10/2005 | Gstir et al. ..................... | 29/27 C |
| 2006/0058908 | A1 * | 3/2006 | Kamiya et al. ................. | 700/186 |
| 2008/0012519 | A1 * | 1/2008 | Ozawa et al. .................. | 318/575 |

FOREIGN PATENT DOCUMENTS

| | | |
|---|---|---|
| JP | 02-046992 A1 | 2/1990 |
| JP | 2000-259218 A1 | 9/2000 |
| JP | 2001-087987 A1 | 4/2001 |
| JP | 2003-022106 A1 | 1/2003 |
| JP | 2004-252880 A1 | 9/2004 |

* cited by examiner

*Primary Examiner* — Charles Kasenge
(74) *Attorney, Agent, or Firm* — Burr & Brown

(57) ABSTRACT

To provide a method to carry out complicated surface machining such as graining or the like without decreasing machining accuracy and machining efficiency. In a machine tool including a main spindle head capable of relatively moving in three perpendicular directions with respect to a workpiece and an additional spindle being provided at the main spindle head and capable of moving in a Z spindle direction, while the main spindle head relatively moves with respect to a working surface S of the workpiece along a smoothly curved surface R which is smoothed so as to be restricted within the movement distance in the moving direction of the additional spindle, the additional spindle moves by a difference between the working surface S and the smoothly curved surface R, and makes a tool T to machine the working surface S.

4 Claims, 7 Drawing Sheets

[FIG. 1]
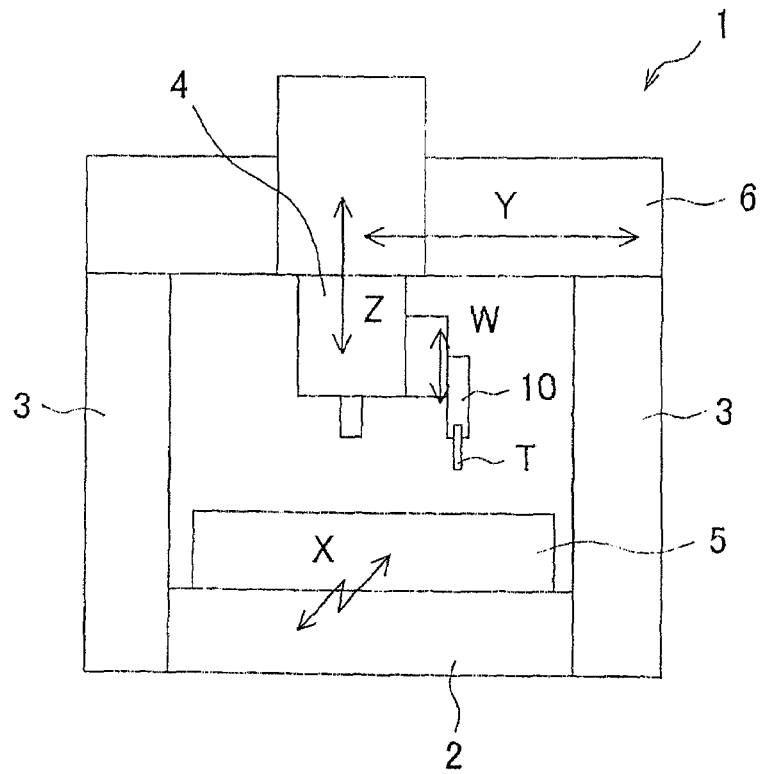
[FIG. 2]
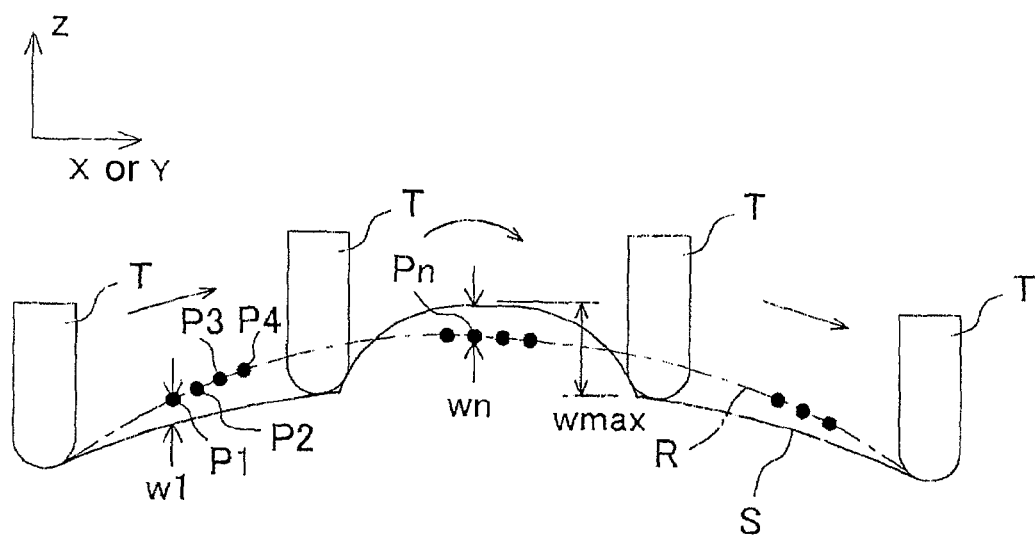

[FIG. 3A]
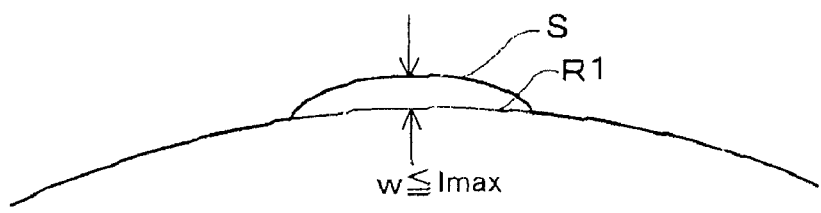
[FIG. 3B]
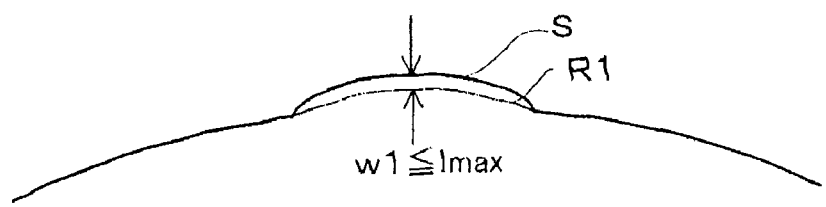
[FIG. 3C]
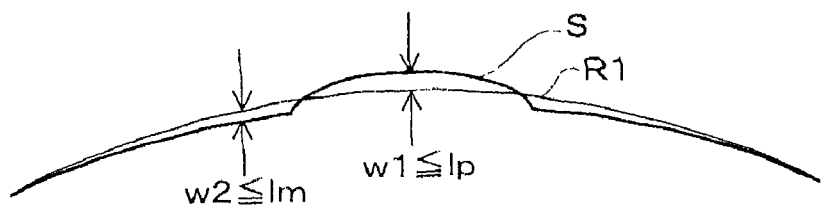

[FIG. 4]
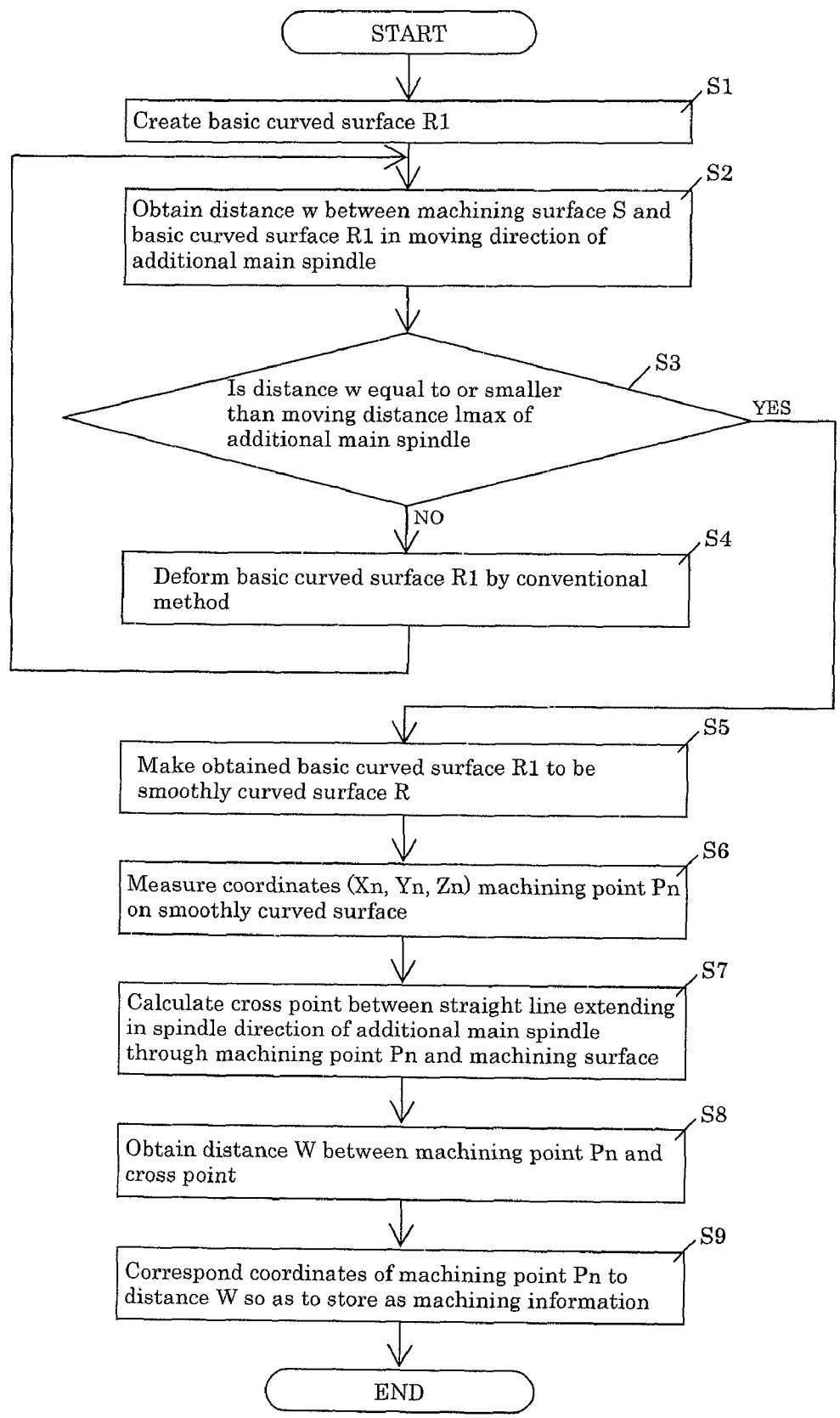

[FIG. 5]
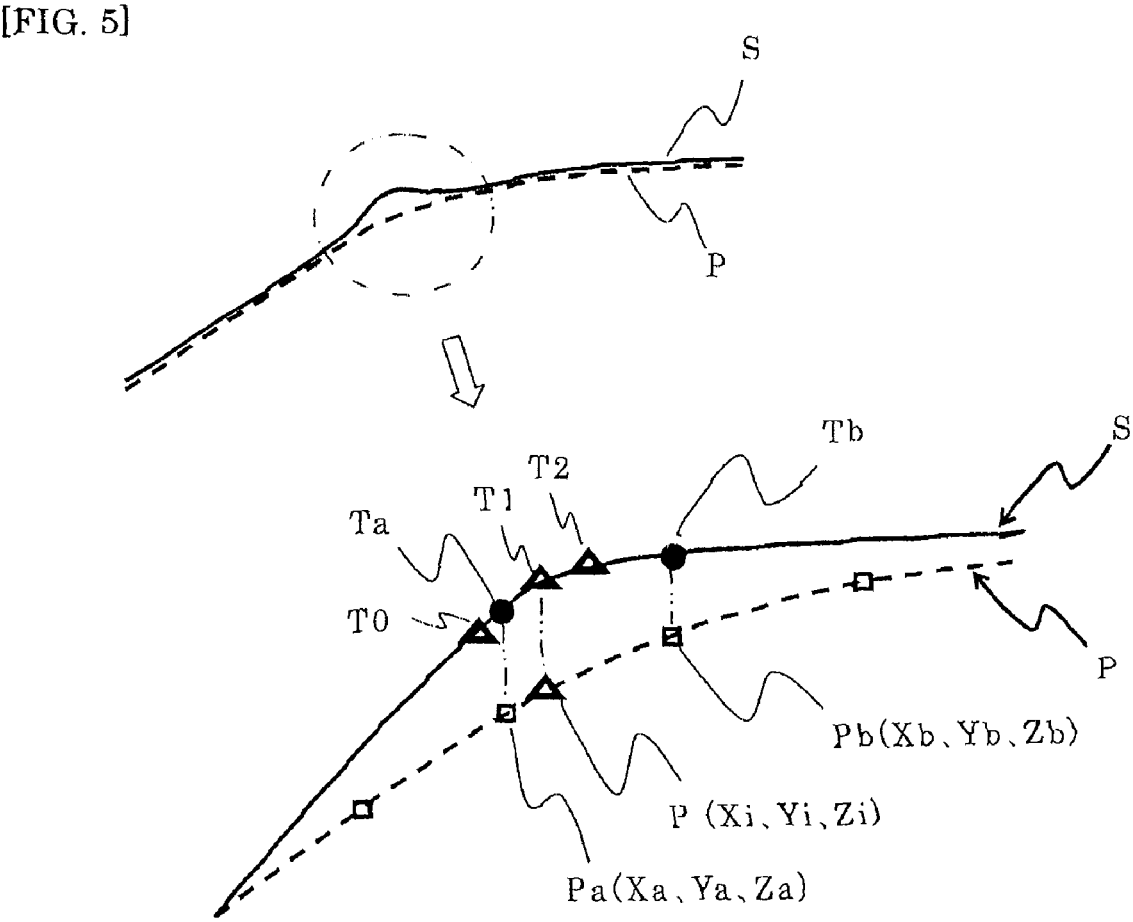

[FIG. 6]
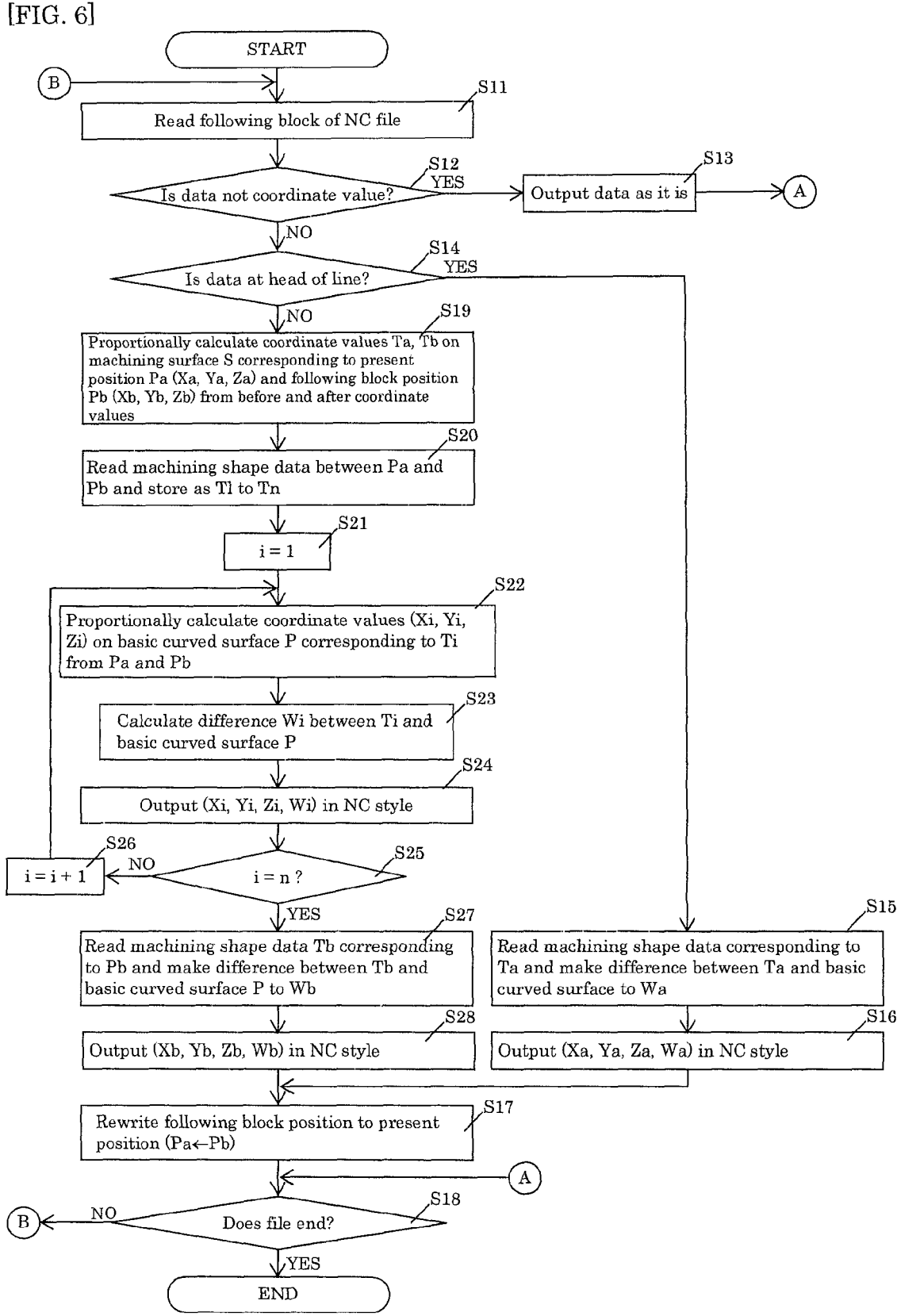

[FIG. 7]
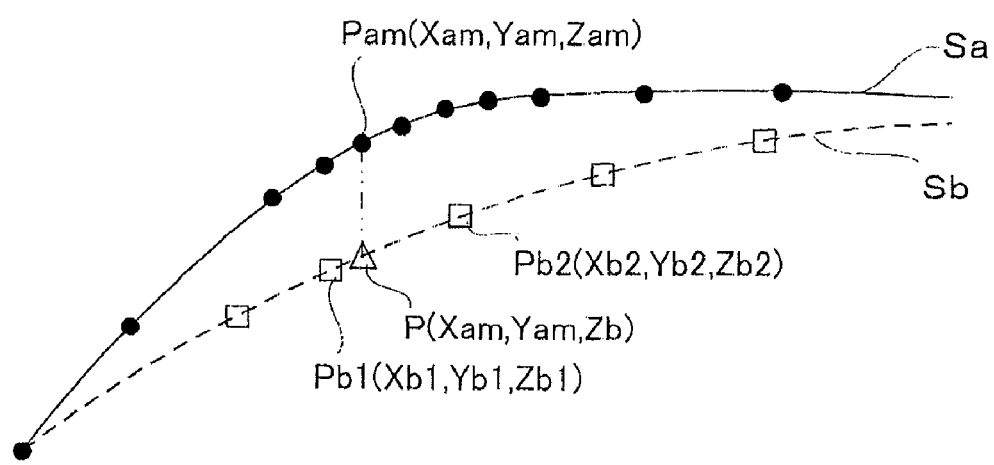

[FIG. 8]
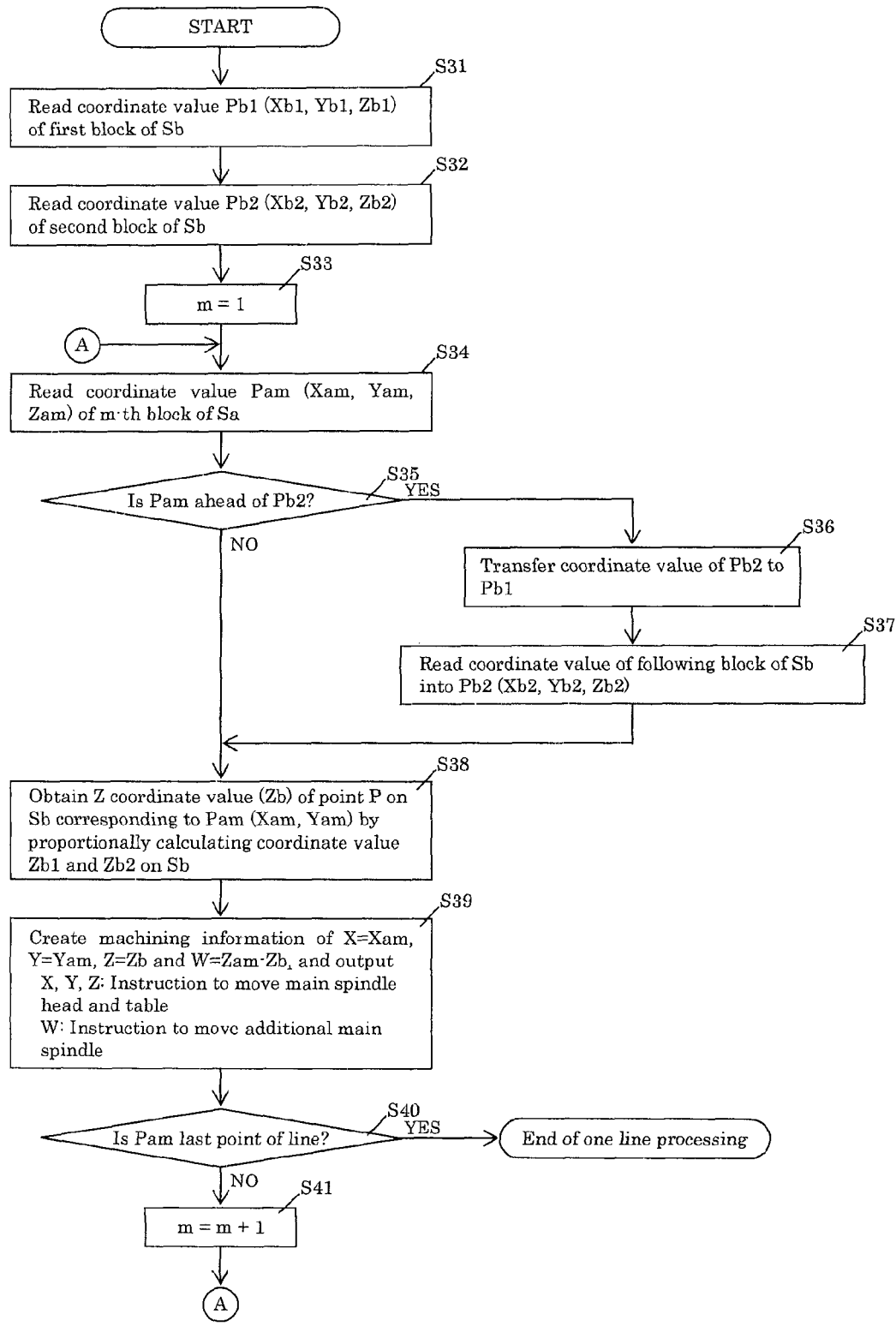

MACHINING CONTROL METHOD AND MACHINING INFORMATION GENERATING METHOD FOR MACHINE TOOL

This application claims the benefit of Japanese Patent Application Number 2006-268683 filed on Sep. 29, 2006, the entirety of which is incorporated by reference.

BACKGROUND OF THE INVENTION

1. Field of the Invention

The present invention relates to a machining control method to perform a complicated surface machining to a workpiece by a machining tool such as a machining center or the like, and a machining information generating method to generate machining information given to a machine tool in order to perform the machining control method.

2. Description of the Background Art

When machining to give a complicated irregular configuration, e.g., graining, to a surface of a workpiece is carried out, for example, a machining control method using an NC control device described in the patent document 1 has been used. The NC control device includes a first input unit for inputting pre-texturing configuration data of a surface, a second input unit for inputting texture data, a data fusion unit for generating a feed rate command specifying a feed rate for a workpiece in the machine tool and a cutting depth command specifying a cutting depth for the workpiece in the machine tool according to the configuration data and texture data, and an output unit for outputting the feed rate command and cutting depth command to the machine tool. In the machine tool, for example, the workpiece is fed in an X-Y direction based on the feed rate command, a tool is fed in a Z direction based on the cutting depth command, and thus integrated machining combining shaping by the profile data and surface texturing by the texture data is carried out.

However, when machining is carried out by a tool attached to a main spindle of a main spindle head, an error may occur in a rough part due to a servo delay since a mass of a moving body is large, and thus configuration accuracy may be reduced. Therefore, it is necessary to machine at a low feed rate in the rough part, which decreases a machining efficiency.

Accordingly, the patent document 2 has proposed a method for generating a tool path in order to machine a product configuration. In this method, the tool path is smoothly formed in a bent part, such as a projected rising portion or the like, by giving a circular arc to the bent part, so that a feed rate reduction of the tool becomes lower.

Patent Document 1: Japanese Unexamined Patent Publication No. 2004-252880

Patent Document 2: Japanese Unexamined Patent Publication No. 2000-259218

SUMMARY OF THE INVENTION

However, in a path generating method in the patent document 2, a machining efficiency decreases since an uncut part remains at a bent part, and a finishing machining is necessary after machining. Further, since machining must be carried out with a control of a large mass of a main spindle, it is still required to reduce a feed rate at a rough part. Thus, machining efficiency does not much improve in this method.

An object of the present invention is to provide a machining control method capable of carrying out complicated surface machining such as graining or the like, keeping the machining accuracy and machining efficiency, and to provide a machining information generating method to perform the machining control method.

In order to achieve the above-described object, the invention is a machining control method for a machine tool, which includes a main spindle head capable of relatively moving in three perpendicular directions with respect to a workpiece, an additional spindle being provided at the main spindle head and capable of moving in a specified direction, and a tool provided at the additional spindle so as to machine the workpiece. In the machining control method, while the main spindle head relatively moves with respect to a working surface of the workpiece along an approximation surface, the additional spindle moves by a difference between the working surface and the approximation surface so as to make the tool machine the workpiece. The approximation surface is formed by smoothing so as to be within a movement distance of the additional spindle in a moving direction of the additional spindle.

In order to achieve the above-described object, the invention is a machining control method for a machine tool, which includes a main spindle head capable of relatively moving in three perpendicular directions to a workpiece, an additional spindle being provided at the main spindle head and capable of moving in the specified direction, and a tool provided at the additional spindle so as to machine the workpiece. In the machining control method, while the main spindle head relatively moves along a basic configuration surface of a working surface of the workpiece, the additional spindle moves by a difference between the working surface and the basic configuration surface so as to make the tool machine the workpiece.

In order to realize the above-described object, the invention is a method to generate machining information in order to perform the machining control method described above. The method includes the steps of obtaining data of an approximation surface based on data of a working surface indicating a configuration of the workpiece, generating moving information of the main spindle head based on the data of the approximation surface, and generating moving information of the additional spindle by a difference between the data of the working surface and the data of the approximation surface in the moving direction of the additional spindle. The approximation surface is formed by smoothing the working surface so as to be within a movement distance of the additional spindle in the moving direction of the additional spindle.

In order to achieve the above-described object, the invention is a method to generate machining information in order to perform the machining control method described above. The method includes the steps of specifying a basic configuration surface of the working surface based on data of a working surface indicating a configuration of the workpiece, generating moving information of the main spindle head based on the data of the basic configuration surface, and generating moving information of the additional spindle by a difference between the data of the working surface and the data of the basic configuration surface in a moving direction of the additional spindle.

In addition, a main spindle head capable of relatively moving in three perpendicular directions with respect to a workpiece in the present invention includes a main spindle head itself moving in three spindle directions, and also includes a main spindle head which is relatively moved in three spindle directions by a movement of a table on which a workpiece is provided, for example, in a X-Y direction so that the main spindle head moves in the Z direction.

According to the inventions described in claims 1 and 2, since the required movement distance is distributed to a main spindle head and an additional spindle, machining at a high feeding rate can be carried out without reducing a feed rate at a rough part. Thus, complicated surface machining such as graining or the like can be carried out without decreasing a machining accuracy and a machining efficiency.

According to the inventions described above, moving information of a main spindle head and an additional spindle can be easily, certainly generated based on data of a working surface. More particularly, in the invention described above, since a basic configuration surface of a working surface is used, it is not necessary to obtain data of a smoothed approximation surface, and thus the method can generate machining information easier than the method described above.

BRIEF DESCRIPTION OF THE DRAWINGS

FIG. 1 is an explanation view of a machine tool;
FIG. 2 is an explanation view of a machining control method;
FIG. 3A-3C is an explanation view to illustrate a generating process of a smoothly curved surface;
FIG. 4 is a flowchart of a machining information generating method;
FIG. 5 is an explanation view to illustrate a modified example of the machining information generating method;
FIG. 6 is a flowchart of a modified example of the machining information generating method;
FIG. 7 is an explanation view to illustrate a modified example of the machining information generating method; and
FIG. 8 is a flowchart of a modified example of the machining information generating method.

DETAILED DESCRIPTION OF THE INVENTION

Preferred embodiments of the present invention will be described below referring to the drawings.

FIG. 1 is an explanation view to illustrate one example of a machine tool. A machine tool 1 includes a bed 2, a pair of columns 3 and 3 fixed at the bed 2, and a cross rail 6 provided between the columns 3 and 3, so as to have a rigid portal structure. The machine tool 1 includes a main spindle head 4 on a front surface of the cross rail 6, and the main spindle head 4 can slide in a Y direction (left and right directions), and move upwardly and downwardly along a Z direction (upper and lower directions). The main spindle head 4 includes an additional spindle 10 to which a tool T to machine a workpiece surface is attached, and the additional spindle 10 can slide in a W spindle direction (the vertical direction in this case) which is parallel to the Z spindle. The bed 2 includes a table 5 which can place a workpiece and slide along an X spindle direction (front and back directions). In addition, the mass of the additional spindle 10 is lower than that of the main spindle head 4.

In the machine tool 1, machining is carried out to a workpiece while the table 5 is fed to the X spindle direction, the main spindle head 4 is fed in the Y spindle and Z spindle directions, and the additional spindle 10 is fed to the W spindle direction. In addition, feeding the main spindle head 4, the table 5 and the additional spindle 10 to each direction is controlled by an NC device provided at the machine tool 1.

Here, control of feeding the main spindle head 4, the table 5 and the additional spindle 10 (a machining control method) at the time of subjecting a workpiece to complicated surface machining will be described using an example in which a working surface S is machined to have a projection part on a workpiece as illustrated in FIG. 2.

When the working surface S is formed, a smoothly curved surface R which is a smoother approximation surface than the working surface S in the Z spindle direction is used. The smoothly curved surface R is a curved surface of which a maximum value wmax of differences $w1, \ldots, wn, \ldots$ is within a movement distance of the additional spindle 10, where the differences $w1, \ldots, wn, \ldots$ are distances between the curved surface and the working surface S in each machining point $P1, P2, \ldots, Pn, \ldots$ in the moving direction (the Z spindle direction in this example) of the addition main spindle 10. Based on machining information generated based on the smoothly curved surface R, the NC device feeds the main spindle head 4 and the table 5 in the X, Y and Z spindle directions so as to feed a top end of the tool T, which is provided at the additional spindle 10, along the machining points $P1, P2, \ldots, Pn, \ldots$ on the smoothly curved surface R. Further, the NC device feeds the additional spindle 10 in the W spindle direction by the differences $w1, \ldots, wn, \ldots$ in the machining points $P1, P2, \ldots, Pn, \ldots$ so as to machine the working surface S.

Then, a machining information generating method in which an instruction is made to move the main spindle head 4, the table 5 and the additional spindle 10 in order to machine the working surface S will be described referring to FIGS. 3 and 4.

The smoothly curved surface R is formed using a basic curved surface R1 based on configuration data of the working surface S in FIG. 3(A) and in S1 in FIG. 4. In addition, the configuration data of the working surface S can be stored, for example, in a data storage unit of a machining information generating device as storage means via input means such as a keyboard, a mouse, or a tablet, and can be arbitrary outputted to output means such as a CRT, or a printer.

Although the basic curved surface R1 is formed corresponding to a smooth configuration of the working surface S in the present embodiment, the curved surface R1 can be a plane surface (for example, a plane surface including a configuration obtained by projecting a machined configuration to a XY plane surface). An operator can specify which machined configuration element is used as a basic curved surface (specify a machined configuration surface on a display, or input the name of a surface), and may specify arbitrary plural points so as to make a curved surface by passing these plural points to a basic curved surface.

Then, the basic curved surface R1 is compared with the working surface S, and a distance w between those in the moving direction of an additional spindle is measured in S2. The distance w is compared with a movement distance lmax of the additional spindle in S3. When a distance w is within the movement distance lmax of the additional spindle, the basic curved surface R1 becomes the smoothly curved surface R in FIG. 3(A) and in S5. When the distance w is more than the lmax, the basic curved surface R1 is deformed by a movement of a control point at a position not within the lmax among control points of a free curved surface indicating the basic curved surface R1, or dividing the curved surface so as to operate the control points, and thus the smoothly curved surface R having the distance w within the movement distance lmax generated in FIG. 3(B) and in S4.

In addition, in a case that a determination value of a distance w1 between the basic curved surface R1 and the working surface S is two values (lp, lm) which are positive and negative distances from the basic curved surface R1, when a basic curved surface R has the w1 within lp and the w2 within lm, the basic curved surface R1 becomes the smoothly curved surface R, as illustrated in FIG. 3(C). Further, the determination value is to determine the movement distance of an additional spindle when a workpiece is machined, and a value within the movement distance of an additional spindle can be properly set corresponding to a configuration of a working surface. Clearly from FIGS. 3(A) and (B), the smoothly curved surface R becomes flat when the determination values is high, and the smoothly curved surface R has a configuration similar to that of the working surface S when the determination value is low.

After data of the smoothly curved surface R is obtained, machining information is generated by the processes from S6 to S9 in FIG. 4. In the present embodiment, an example of controlling three spindles will be described.

At first, a coordinate (Xn, Yn, Zn) of a machining point Pn on the smoothly curved surface R is measured by a conventional method in S6. Then, a cross point between a straight line, which extends in the spindle direction of the additional spindle 10 through the machining point Pn, and the working surface S is calculated in S7. A distance W between the machining point Pn and the crossing point is measured in S8. Then, machining information is stored corresponding the coordinates of the machining point Pn to the distance W in S9.

When this processing is repeatedly carried out to one machining curved line on the smoothly curved surface R, machining information relating to the machining curved line can be obtained. By carrying out this processing to the whole smoothly curved surface R, machining information of the whole working surface S, which is shown in Table 1, can be obtained.

TABLE 1

| G01 | Xx1 | Yy1 | Zz1 | Ww1 | F** |
|---|---|---|---|---|---|
| | Xx2 | Yy2 | Zz2 | Ww2 | |
| | Xx3 | Yy3 | Zz3 | Ww3 | |
| | Xx4 | Yy4 | Zz4 | Ww4 | |
| | Xx5 | Yy5 | Zz5 | Ww5 | |

X, Y, Z: Instruction to move a main spindle head and a table (moving information of a main spindle head and a table)
W: Instruction to move an additional spindle (moving information of an additional spindle)

According a machining control method based on the machining information obtained by the above-described processes, machining can be carried out while feeding the main spindle head 4 having high mass along the smoothly curved surface R which is smoother than the working surface S, and feeding the additional spindle 10 having comparatively low mass in the W spindle direction by the differences w1, ..., wn, ... between the smoothly curved surface R and the working surface S at the machining points P1, P2, Pn, ... on the smoothly curved surface R. That is, since the required movement distance is divided to the main spindle head 4 and the additional spindle 10, machining at a high feeding rate can be carried out without reducing a feed rate at a rough part. Thus, complicated surface machining such as graining or the like can be carried out without decreasing a machining accuracy and a machining efficiency.

Further, the machining information generating method of the above-described embodiment includes the steps of; obtaining data of the smoothly curved surface R based on data of the working surface S; generating moving information of the main spindle head 4 based on the data of the smoothly curved surface R; and generating moving information of the additional spindle 10 by the difference between the data of the working surface S and the data of the smoothly curved surface R in the moving direction of the additional spindle 10. The smoothly curved surface R is formed by smoothing the working surface S so as to be within the movement distance of the additional spindle 10 in the moving direction of the additional spindle 10. Thus, machining information required for the above-described machining control method can be easily, certainly generated based on the configuration data of the working surface S and the smoothly curved surface R.

In addition, the machining information generating method of the above-described embodiment includes the steps of obtaining data of the smoothly curved surface R, generating moving information of the main spindle head 4 based on the data of the smoothly curved surface R, and generating moving information of the additional spindle 10 by the difference between the data of the working surface S and the data of the smoothly curved surface R. However, machining information can be generated based on a basic configuration surface on which fine irregularities on a working surface are removed, without obtaining data of a smoothly curved surface. This machining information generating method will be described below.

As illustrated in FIG. 5, the present embodiment uses NC data of the basic curved surface P as the basic configuration surface and machining configuration data of the working surface S having fine irregularities. The NC data of the basic curved surface P is previously generated by a conventional method based on the basic configuration data of the working surface S from which the fine irregularities are removed, and stored. Further, the machining configuration data of the working surface S is represented as coordinate values (Tm, Tn, ...) at fine intervals.

FIG. 6 is a flowchart of a machining information generating method of the present embodiment. In FIG. 6, the machining information generating method reads a next block from a file of the NC data of the basic curved surface P in S11. Then, the method determines whether the read data is a coordinate value or not in S12. When the data is not the coordinate value, the method outputs the data as it is in S13. When the data is the coordinate value, the method discriminates whether or not the data is at the head of a line in S14. When the data is the head of a line, the method reads the machining configuration surface data Ta corresponding to Pa so as to make a difference between the machining configuration surface data Ta and the data of the basic curved surface P into Wa in S15. Then, the method outputs (Xa, Ya, Za, Wa) in a NC style in S16 and rewrites the next block position to the present position (Pa←Pb) in S17. When the method does not discriminate that a file does not end in S18, the processing returns to S11.

On the other hand, when the machining information generating method discriminates that the data is not at the head of a line in S14, the method proportionally calculates coordinate values Ta and Tb on the working surface S corresponding to a present position Pa (Xa, Yb, Za) and a following block position Pb (Xb, Yb, Zb) from adjacent coordinate values, e.g., $T_0$ and $T_1$. Then, the method reads machining configuration data between Pa and Pb, and stores it as T1 to Tn in S20.

Next, the machining information generating method determines first machining configuration data from Pa in S21 and proportionally calculates coordinate values (Xi, Yi, Zi) on the basic curved surface P corresponding to Ti from Pa and Pb in S22. Then, the method calculates a difference Wi between Ti and the basic curved surface P in S23, and outputs (Xi, Yi, Zi, Wi) in a NC style in S24.

When the machining information generating method discriminates that the machining configuration data is the n-th, that is, is not the last data in S25, the method reads the following machining configuration data, repeats the processes from S22 to S24 as the data for following machining, and outputs all machining configuration data between Pa and Pb in a NC style in S26. After processing the last machining configuration surface data in S25, the method reads machining configuration data Tb corresponding to Pb and makes a difference between the data Tb and the basic curved surface P into Wb in S27. Then, the method outputs (Xb, Yb, Zb, Wb) in the NC style in S28.

When generating NC data between blocks is ended, the machining information generating method rewrites the following block position to the present position in S17 and ends generating NC data when the file is ended in S18.

A method to obtain moving information of a main spindle head and an additional spindle will be described referring to the flowchart in FIGS. 7 and 8 by using NC data Pa of a working surface Sa having fine irregularities and NC data Pb on a basic curved surface Sb on which the fine irregularities are removed. In addition, each NC data is previously generated by a conventional method and stored.

The method to obtain moving information of the main spindle head and the additional spindle reads a coordinate value Pb1 (Xb1, Yb1, Zb1) of a first block on Sb in S31. Then, the method reads a coordinate value Pb2 (Xb2, Yb2, Zb2) of a second block of Sb in S32. The method determines first NC data in S33, and reads a coordinate value the Pam (Xam, Yam, Zam) of an m-th block of Sa in S34. Next, the method discriminates whether Pam is ahead of Pb2 or not in S35. When Pam is ahead of Pb2, the method transfers the coordinate value of Pb2 to Pb1 in S36, and reads a coordinate value of the following block into (Xb2, Yb2, Zb2) as Pb2 in S37.

On the other hand, when the method discriminates that Pam is not ahead of Pb2 in S35, the method proportionally calculates coordinates values Zb1 and Zb2 on Sb, and measures a Z coordinate value Zb at a point P on Sb corresponding to a coordinate value Pam (Xam, Yam) in S38. Then, the method generates machining information of X=Xam, Y=Yam, Z=Zb and W=Zam−Zb, and outputs it in S39. These information of X, Y and Z are an instruction for moving the main spindle head 4 and the table 5 (moving information of the main spindle head 4), and the information of W is an instruction for moving the additional spindle 10 (moving information of the additional spindle 10).

Then, the method to obtain moving information of the main spindle head and the additional spindle discriminates whether Pam is a last point on a line or not in S40. When Pam is the last point, one line processing is ended. When Pam is not the last point, the method makes the point as m=m+1-th and repeats the processings from S34 to S40 in S41.

Based on machining information obtained by the above-described processing, the NC machine carries out machining the working surface S or Sa by feeding the main spindle head 4 and the table 5 in the X, Y and Z spindle directions so as to feed a top end of the tool T provided at the additional spindle 10 along machining points on the basic curved surface P or Sa. The NC machine also carries out machining by feeding the additional spindle 10 in the W spindle direction at each machining point. The spindle head 4, the table 5, and the additional spindle 10 are fed based on NC data of a basic curved surface (Pa, P, . . . , Pb, . . . in FIG. 5, Pb1, P, . . . , Pb2, . . . in FIG. 7).

Accordingly, in this machining control method, since the required movement distance is divided to the main spindle head 4 and the additional spindle 10, machining at a high feeding rate can be carried out without reducing a feed rate at the rough part. Thus, complicated surface machining such as graining or the like can be carried out without decreasing the machining accuracy and the machining efficiency.

In the machining information generating method described referring to FIGS. 5, 6, 7 and 8, it is possible to generate the NC data of the basic curved surface P and machining configuration surface of the working surface S having the fine irregularities, or the NC data Pa of the working surface Sa and NC data Pb of the basic curved surface Sb. Then, moving information of the main spindle head 4 can be generated based on the NC data of the basic curved surface P or the NC data Pb of the basic curved surface Sb. Further, moving information of the additional spindle 10 can be generated based on a difference between the machining configuration data of the working surface S and the NC data of the basic curved surface P in the moving direction of the additional spindle 10, or a difference between the NC data Pa of the working surface Sa and the NC data Pb of the basic curved surface Sb in the moving direction of the additional spindle 10. Accordingly, machining information can be easily, certainly generated.

In addition, data of a smoothly approximation surface or a basic configuration surface to generate moving information is not limited to the above-described embodiment, and can be properly changed to be used. For example, in the flowchart of FIG. 4, a basic curved surface on which fine irregularities are removed on a working surface can be specified instead of generating a smoothly curved surface so as to obtain machining points on the specified basic curved surface, and moving information of an additional spindle can be obtained by a difference between the machining points and the working surface. Further, in the machining information generating method illustrated in FIGS. 5 to 8, moving information of an additional spindle can be obtained using machining configuration data of the basic curved surface and NC data of the working surface instead of NC data of the basic curved surface.

Of course, the basic configuration surface is not limited to a curved surface, and can be a plane surface, or the combination of a plane surface and a curved surface.

On the other hand, the embodiment of a machine tool is not limited to the above-described embodiment, and can be carried out in an embodiment, for example, a table moves in only one direction of XY and the main spindle head moves by two spindles, or the table is fixed and the main spindle head moves by three spindles. A method to move the main spindle head is not limited to three spindles, i.e., X, Y and Z spindles, and can use a machining center to control four or five spindles including a rotary spindle, or a machining center using a parallel link which moves an end effector in an arbitrary attitude while supporting by a plurality of actuators. A method to move the additional spindle is also not limited to the Z spindle, and can move in the other directions in the present invention. The present invention includes a case that an additional spindle is provided at a main spindle head as an attachment.

Therefore, when machining information is generated controlling four or five spindles including a rotary spindle, for example, a normal direction at machining points on a smoothly curved surface is calculated, and an angle of the normal direction can be made into an angle to instruct a rotary spindle. Further, an angle with respect to the normal direction is fixedly inclined, and the angle can be made into the angle to instruct the rotary spindle.

In the machining information generating method of the above-described embodiment, machining points on a curved surface are generated as machining information. However, machining information can be generated by offsetting a smoothly curved surface and a working surface by the radius of a tool so as to obtain a tool center coordinate.

What is claimed is:

1. A machining control method for a machine tool, that comprises a main spindle head capable of relative movement in three perpendicular directions with respect to a workpiece, an additional spindle provided at the main spindle head and capable of moving itself in a specified direction, moving with the relative movement of the main spindle head so as to relatively move with respect to the workpiece, and a tool provided at the additional spindle so as to machine the workpiece, said method comprising:

obtaining an approximation surface formed by smoothing so as to be restricted within a movement distance of the additional spindle in a moving direction of the additional spindle with respect to a working surface of the workpiece, and obtaining a difference in a moving direction of the additional spindle between the working surface and the approximation surface, moving the main spindle head relatively along the approximation surface and simultaneously moving the additional spindle by the difference only so as to make the tool provided at the additional spindle machine the workpiece.

2. A machining information generating method for making a machine tool execute the machining control method according to claim 1, said method comprising the steps of:

obtaining data of the approximation surface based on data of the working surface indicating a configuration of the workpiece;

obtaining a machining point based on the data of the approximation surface;

generating moving information of the main spindle head, where the information contains a machining point on the approximation surface; and generating moving information of the additional spindle where the information contains a difference between the data of the working surface corresponding to the machining point on the approximation surface and the data of the approximation surface in the moving direction of the additional spindle.

3. A machining control method for a machine tool that comprises a main spindle head capable of relative movement in three perpendicular directions with respect to a workpiece, an additional spindle provided at the main spindle head and capable of moving itself in a specified direction, with the relative movement of the main spindle head so as to relatively move with respect to the workpiece, and a tool provided at the additional spindle so as to machine the workpiece having a working surface with irregularities, said method comprising:

specifying a basic configuration surface of the working surface of the workpiece on which fine irregularities are removed, obtaining a difference in a moving direction of the additional spindle between the working surface and the specified basic configuration surface of the workpiece, the main spindle head relatively along the basic configuration surface and simultaneously moving the additional spindle by the difference only so as to make the tool provided at the additional spindle machine the workpiece having the working surface with irregularities thereon.

4. A machining information generating method for making a machine tool execute the machining control method according to claim 3, said method comprising the steps of:

specifying the basic configuration surface of the working surface on which fine irregularities are removed based on data of the working surface indicating a configuration of the workpiece;

obtaining a machining point based on the data of the basic configuration surface;

generating moving information of the main spindle head, where the information contains a machining point on the basic configuration surface; and generating moving information of the additional spindle where the information contains a difference between the data of the working surface corresponding to the machining point on the basic configuration surface and the data of the basic configuration surface in a moving direction of the additional spindle.

* * * * *